(12) United States Patent
Eilebrecht

(10) Patent No.: US 8,510,604 B2
(45) Date of Patent: Aug. 13, 2013

(54) STATIC DATA RACE DETECTION AND ANALYSIS

(75) Inventor: Eric L. Eilebrecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 13/039,090

(22) Filed: Mar. 2, 2011

(65) Prior Publication Data

US 2012/0226944 A1 Sep. 6, 2012

(51) Int. Cl.
*G06F 11/28* (2006.01)

(52) U.S. Cl.
USPC ............... 714/38.1; 714/6.1; 714/10; 714/25; 714/37; 714/54

(58) Field of Classification Search
USPC .................................. 714/10, 38.1
See application file for complete search history.

(56) References Cited

U.S. PATENT DOCUMENTS

| | | | |
|---|---|---|---|
| 6,343,371 B1 * | 1/2002 | Flanagan et al. | 717/124 |
| 7,685,572 B1 * | 3/2010 | Qiao | 717/126 |
| 7,752,605 B2 | 7/2010 | Qadeer et al. | |
| 7,784,035 B2 | 8/2010 | Kahlon et al. | |
| 2002/0129306 A1 * | 9/2002 | Flanagan et al. | 714/100 |
| 2003/0028864 A1 * | 2/2003 | Bowen | 717/141 |
| 2007/0011671 A1 * | 1/2007 | Kahlon et al. | 717/170 |
| 2007/0143742 A1 * | 6/2007 | Kahlon et al. | 717/124 |
| 2007/0245312 A1 * | 10/2007 | Qadeer et al. | 717/124 |
| 2009/0049545 A1 * | 2/2009 | Nagpal et al. | 726/22 |
| 2009/0319608 A1 * | 12/2009 | Anil et al. | 709/204 |
| 2009/0328019 A1 * | 12/2009 | Detlefs et al. | 717/159 |
| 2010/0088681 A1 * | 4/2010 | Wang et al. | 717/126 |
| 2010/0235817 A1 * | 9/2010 | Kahlon et al. | 717/126 |
| 2012/0204062 A1 * | 8/2012 | Erickson et al. | 714/35 |

OTHER PUBLICATIONS

Vineet Kahlon et al., Fast and Accurate Static Data-Race Detection for Concurrent Programs, 2007, (14 pages).
Dawson Engler et al., RacerX: Effective, Static Detection of Race Conditions and Deadlocks, Oct. 22, 2003, (16 pages).
Pin Zhou et al., HARD: Hardware-Assisted Lockset-based Race Detection, Apr. 10, 2007, (pp. 121-132).
Feng Zhou, Survey: Race Detection and Atomicity Checking, Dec. 16, 2003, (11 pages).

* cited by examiner

*Primary Examiner* — Chae Ko
(74) *Attorney, Agent, or Firm* — Workman Nydegger

(57) ABSTRACT

Static data race analysis of at least a portion of a multi-threaded application in order to identify potential data race defects in the multi-threaded application. The static data race analysis includes intra-component static analysis as well as inter-component static analysis. The intra-component static analysis for a given component involves identifying a set of memory accesses operations in the component. For each of at least one of the set of memory access operations, the analysis determines whether there is a data race protection element associated with the memory access command.

20 Claims, 3 Drawing Sheets

STATIC DATA RACE DETECTION AND ANALYSIS

BACKGROUND

Multi-threaded processing is performed on computing systems that have multiple processors that are simultaneously operating. Oftentimes, multiple threads may share the same memory. However, multi-threaded applications that run with shared memory can often lead to subtle data race defects that are often difficult to find through testing. For example, data race defects may result from the failure to acquire a lock before accessing shared memory, or perhaps the failure to take memory-ordering semantics into account in lock-free or low-lock algorithms. Data race defects can result in processes accessing inconsistent data, thereby adversely affecting the functionality of the multi-threaded applications.

Many dynamic race detection techniques have been developed. However, by their very nature, "dynamic" race detection involves actually running the application to detect behavior of the executing application, which may not be practical. Static race detection techniques have also been developed, which do not require execution of the application, but rather examine the code of the multi-threaded application. Such static race detection techniques are often computationally intensive and/or rely on annotations in the code in order to identify potential data race problems.

BRIEF SUMMARY

At least one embodiment described herein relates to static data race analysis of at least a portion of a multi-threaded application in order to identify potential data race defects in the multi-threaded application. The static data race analysis includes intra-component static analysis as well as inter-component static analysis.

The intra-component static analysis for a given component involves identifying a set of memory access operations in the component. For each of at least one of the set of memory access operations, the analysis determines whether there is a data race protection element associated with the memory access command. In one embodiment, if the operation is protected by a lock, that in itself is sufficient to be considered a data race protection element. In addition, in another embodiment, if a memory access is a volatile memory access (i.e., a memory access with explicit ordering semantics that are respected by both the compiler and the processor), this volatile nature is also sufficient to be considered a data race protection element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, static data race analysis of at least a portion of a multi-threaded application identifies potential data race defects in the multi-threaded application. The static data race analysis includes intra-component static analysis as well as inter-component static analysis. First, some introductory discussion regarding computing systems will be described with respect to FIG. 1. Then, the embodiments of the static data race analysis will be described with respect to FIGS. 2 through 5.

Figure 1:
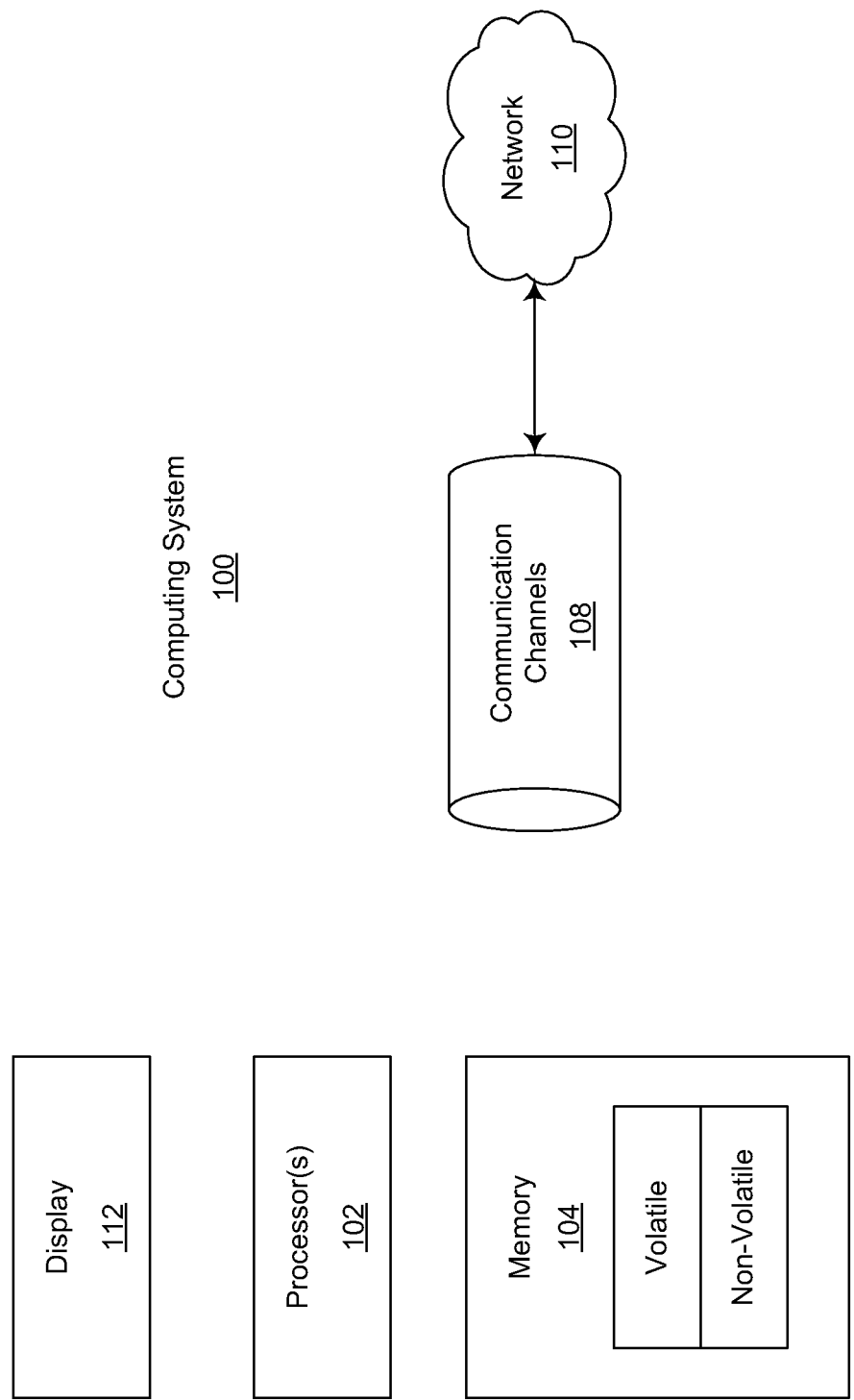
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
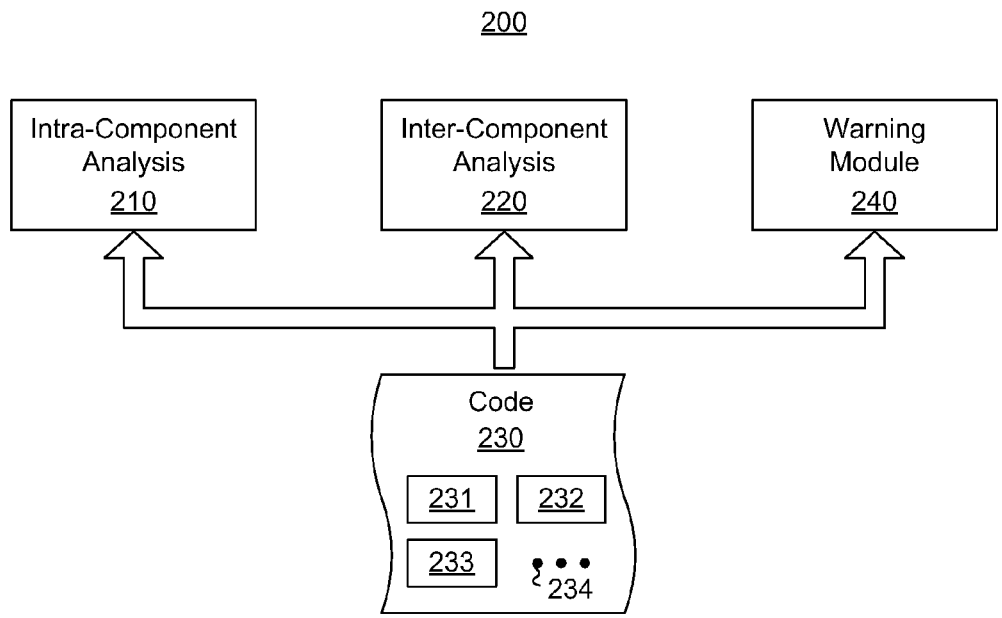
FIG. 2 abstractly illustrates a computing environment that statically analyzes code that has multiple components.
Figure 3:
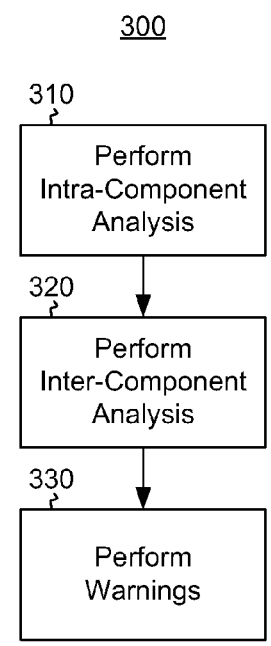
FIG. 3 illustrates a flowchart of a method for performing static analysis of code.

FIG. 2 abstractly illustrates a computing environment 200 that statically analyzes code that has multiple components. For instance, in FIG. 2, the intra-component analyzer 210 and the inter-component analyzer 220 statically analyze code 230. FIG. 3 illustrates a flowchart of a method 300 for performing static analysis of such code. The method 300 includes an act of performing intra-component analysis (act 310), and performing inter-component analysis (act 320). Although intra-component analyses may be performed entirely before inter-component analysis, the two forms of analyses may also be performed concurrently so long as processing dependencies are maintained. Once the analysis is performed via intra-component and inter-component analysis (acts 310 and 320), appropriate warnings are issued (act 330).

The computing environment 200 may have been created in the memory hierarchy of a computing system (such as the computing system 100) in response to the computing system executing computer-execution instructions. Such computer-executable instructions may be included within computer-readable media, such as computer storage media, that is accessible to the computing system in the form of a computer program product.

In FIG. 2, the code 230 is illustrated as containing three components 231, 232 and 233, although the ellipses 234 represents that the computing environment 200 may be used to statically analyze any code having any number of components. Examples of components include functions, methods, or modules. The code 230 (and thus its components) may be accessed in intermediate code form, perhaps with the memory access operations being explicit in the intermediate code. Alternatively, the code 230 may be accessed in a form in which perhaps all of the memory access operations are not explicit. For instance, the code 230 might be source code. In that case, some compilation of the code 230 may be useful to identify where the memory access operations occur.

Figure 4:
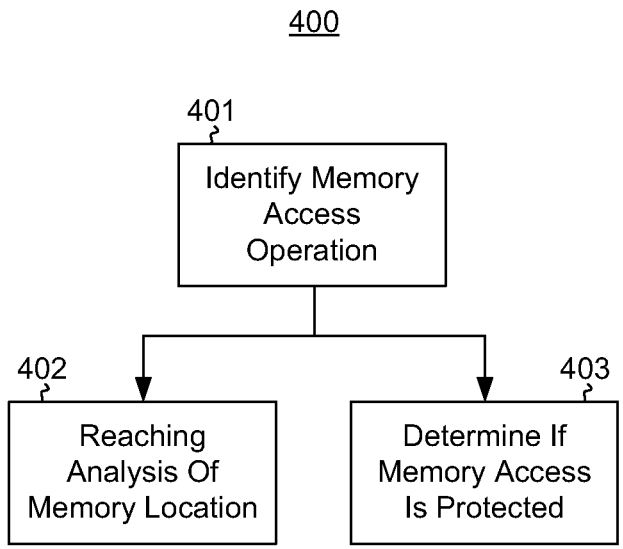
FIG. 4 illustrates a flowchart of a method for performing intra-component analysis.
Figure 5:
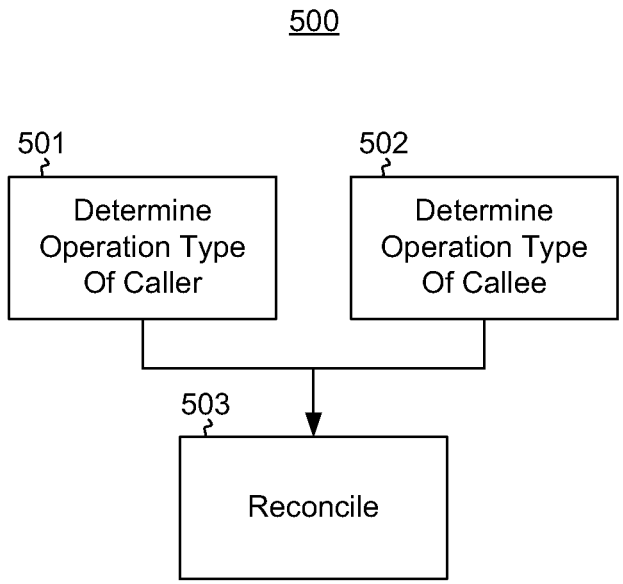
FIG. 5 illustrates a flowchart of a method for performing inter-component static analysis.

The intra-component analyzer 210 analyzes memory accesses and function calls within each component under analysis to determine which memory access operations have protection against data races, and to identify which function calls have protection against data races. FIG. 4 is a flowchart of a method 400 for performing intra-component analysis and may be performed by the intra-component analyzer 210 of FIG. 2. The inter-component analyzer 220 analyzes interaction between components to determine what impact, if any, unprotected function calls have on risk of data races. FIG. 5 is a flowchart of a method 500 for performing inter-component analysis and may be performed by the inter-component analyzer 220 of FIG. 2.

The result of the intra-component analysis and the inter-component analysis is a compiled list of memory locations that may be accessible from global variables (hereinafter referred to as "global memory locations"). Through intra-component and inter-component analysis, there may also be a compiled list of global memory locations that are known to have been written to. These global memory locations are considered to be "mutable." All other global memory locations are considered to be "immutable."

A warning module 230 uses this compiled list of mutable global memory locations and does another pass through the components of the code. The warning module issues warnings to the user, for example, through the display 112 of FIG. 1. The warning module 230 warns about direct unprotected reads from any mutable global memory location (i.e., unprotected reads from a memory location that is written to and that is accessible globally), direct unprotected writes to any global memory location (i.e., unprotected writes to memory location that are accessible globally), unprotected method calls to a method that writes to an argument in which the caller passed in global data and unprotected method calls to a method that reads from an argument in which the caller passed in mutable global data.

FIG. 4 illustrates a flowchart of a method 400 for performing intra-component analysis. The method 400 may be performed for each of at least some of the components of the code under evaluation, and may be performed on as many as all of the components of the code. The intra-component analysis identifies a set of memory access operations in the corresponding component (act 401).

For each memory access operation, a reaching analysis is performed on the accessed memory location (act 402) to identify whether the memory location is accessible globally (from outside the component), whether the memory location is accessed by a parameter, or whether the memory location is only locally accessible from within the component. In one embodiment, if the corresponding accessed data is not determined to be a known globally accessible location, and is not determined to be accessed from a function parameter, the corresponding accessed data is assumed to be only locally accessible.

If the memory location is only locally accessible, the memory access operation is not at risk for data races and thus need not be further tracked for potential data race violations. If the memory location is globally accessible, then that globally accessible memory location is further tracked during inter-component analysis to determine whether the globally accessible location is mutable (i.e., is written to). If the memory location is accessed from a function parameter, further inter-procedural analysis is needed to determine if the memory location is globally accessible. In some embodiments, alias analysis is not performed to determine all the ways that the memory location may be accessed. This reduces the processing resources required to perform the static analysis.

For each memory access operation, it is also determined whether there is an associated data race protection element that reduces the risk of a data race violation (act 403). One example of such a data race protection element is a lock, in which the memory access operation locks the memory location so that other threads cannot access the memory location while the component is performing the memory access operation. Another example of a data race protection element is a volatile memory access indication. A volatile memory access has explicit ordering semantics that are respected by both the compiler and the processor. Accordingly, a volatile memory access indication includes implicit data race protection, and prevents the compiler and processor from reordering the memory access operation with other operations. The component may include any combination of locks and volatile memory accesses as data race protections.

FIG. 5 illustrates a flowchart of a method 500 for performing inter-component static analysis. Once again, this method may be performed for each of at least some of the components of the code, and may perhaps be performed for all of the components of the code. The method 500 determines a type of operation a caller component performs on the parameter of the component (act 501), determines a type of operation that an associated callee component performs on the parameter of the component (act 502), and reconciles the determinations of the two types of operation to identify whether the operation is protected from a data race (act 503).

After doing the intra-component analysis on each function, the inter-component analysis determines all of the types of operations each method (and its callees) performs on each of its parameters, and any global variables (and their referrents) it accesses. This works by effectively "inlining" all calls. For instance, if method A passes data B to method C while holding a lock, and method C is known to write to the data passed to it, then we consider method A to be writing to B while holding a lock.

In one embodiment, this reconciliation does not devirtualize virtual calls, interface calls, or delegate calls. In that case, the reconciliation process may not be able to transparently perform reaching analysis through such calls. Thus, this does reduce the run-time of the analysis though with some potential loss in accuracy. From this inter-component analysis, the list of global memory locations is determined, and the types of operations that are performed on the corresponding memory location are identified. From this, the appropriate warnings may be issued as described above with respect to the warning module 240.

The static analysis described herein reduces the complexity of the static analysis since one or more of the following may be eliminated from the process:

1) Alias analysis to evaluate all the possible ways that a memory location may be accessed;

2) Lock matching to determine whether the type of lock imposed on a memory access operation or function call is the correct type of lock; and 3) Devirtualization of virtual function calls.

This static analysis does not require the use of annotations in methods and may be performed on quite complex programs. Optional annotations may be used, however. For instance, optional annotations may be used in methods that are meant to be called on unprotected global data ("thread-safe" methods). Each parameter of a method may be optionally tagged as "thread-safe." When analyzing such a method, each parameter so marked is considered to be global mutable data, and the user is warned as such. When analyzing these methods' callers, the static analysis may consider it safe to pass global data to these methods, even without holding a lock. This increases the number of problems the analysis can find, particularly when analyzing library code in isolation, such that not all methods are actually called by code being analyzed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage media having thereon computer-executable instructions that are structured such that, when executed by one or more processors of a computing system, cause the computing system to perform a method for performing static data race analysis of at least a portion of a multi-threaded application in order to identify potential data race defects in the multi-threaded application, the method comprising:

an act of performing intra-component static analysis for at least a plurality of components of the multi-threaded application, the intra-component analysis comprising the following for each of at least some of the plurality of components:

an act of identifying a set of memory access operations in the component; and for each of the memory access operations in the set of memory access operations in the component, performing the following:

an act of determining whether there is a data race protection element associated with the memory access operation; and an act of performing inter-component static analysis on the plurality of components.

2. The computer program product in accordance with claim 1, wherein the act of performing inter-component static analysis comprises the following for each of at least some of the plurality of components for at least one parameter of the corresponding component:

an act of determining a type of operation a caller component performs on the parameter of the component;

an act of determining a type of operation that an associated callee component performs on the parameter of the component; and an act of reconciling the determinations of the two types of operation to identify whether the operation is protected from a data race.

3. The computer program product in accordance with claim 2, wherein the act of reconciling inlines code from the callee component into code of the caller component.

4. The computer program product in accordance with claim 2, wherein the act of reconciling does not devirtualize virtual function calls.

5. The computer program product in accordance with claim 1, wherein the data race protection element for a given memory access is that the memory access is protected by a lock.

6. The computer program product in accordance with claim 5, wherein the intra-component static analysis does not match a lock object associated with the lock to a protected memory location.

7. The computer program product in accordance with claim 1, wherein the data race protection element for a given memory access operation is that the memory access is a volatile memory access in which a compiler is signaled to not reorder the memory access operation.

8. The computer program product in accordance with claim 1, wherein the data race protection element for a first memory access is that the first memory access is protected by a lock, and wherein the data race protection element for a second memory access is that the second memory access is a volatile memory access.

9. The computer program product in accordance with claim 8, wherein the first memory access and the second memory access in the plurality of components such that, during execution, the second memory access occurs before the first memory access.

10. The computer program product in accordance with claim 8, wherein the first memory access and the second memory access in the plurality of components such that, during execution, the second memory access occurs after the first memory access.

11. The computer program product in accordance with claim 1, wherein the plurality of components are in intermediate code.

12. The computer program product in accordance with claim 11, wherein the set of memory access operations are explicit in the intermediate code.

13. The computer program product in accordance with claim 1, wherein the plurality of components are in source code.

14. The computer program product in accordance with claim 1, wherein the intra-component analysis further comprises the following for each of at least some of plurality of components:

an act of performing a reaching analysis on the set of memory access operations to determine whether the corresponding accessed data is known globally accessible, or accessed from a function parameter.

15. The computer program product in accordance with claims 14, wherein if, for a particular memory access operation, the corresponding accessed data is not determined to be known globally accessible, and is not determined to be accessed from a function parameter, the corresponding accessed data is assumed to be only locally accessible.

16. The computer program product in accordance with claim 14, wherein the intra-component analysis does not do alias analysis to determine all the ways the corresponding accessed data may be accessed.

17. A method for performing static data race analysis of at least a portion of a multi-threaded application in order to identify potential data race defects in the multi-threaded application, the method comprising:

an act of performing intra-component static analysis of a multi-threaded application; and an act of performing inter-component static analysis on the plurality of components, wherein the act of performing inter-component static analysis comprises the following for each of at least some of the plurality of components for at least one parameter of the corresponding component:

an act of determining a type of operation a caller component performs on the parameter of the component;

an act of determining a type of operation that an associated callee component performs on the parameter of the component; and an act of reconciling the determinations of the two types of operation to identify whether the operation is protected from a data race.

18. The method in accordance with claim 17, wherein the act of reconciling inlines code from the callee component into code of the caller component.

19. The method in accordance with claim 17, wherein the act of reconciling does not devirtualize virtual function calls.

20. A computer program product comprising one or more computer storage media having thereon computer-executable instructions that are structured such that, when executed by one or more processors of a computing system, cause the computing system to perform a method for performing static data race analysis of at least a portion of a multi-threaded application in order to identify potential data race defects in the multi-threaded application, the method comprising:

an act of performing intra-component static analysis for at least a plurality of components of the multi-threaded application, the intra-component analysis comprising the following for each of at least some of plurality of components:
  an act of identifying a set of memory access operations in the component; and
  for each of the memory access operations in the set of memory access operations in the component, performing the following:
    an act of determining whether there is a data race protection element associated with the memory access command; and
an act of performing inter-component static analysis on the plurality of components, wherein the act of performing inter-component static analysis comprises the following for each of at least some of the plurality of components for at least one parameter of the corresponding component:
  an act of determining a type of operation a caller component performs on the parameter of the component;
  an act of determining a type of operation that an associated callee component performs on the parameter of the component; and
  an act of reconciling the determinations of the two types of operation to identify whether the operation is protected from a data race.

* * * * *